United States Patent  [15] 3,650,904
Hata et al.  [45] Mar. 21, 1972

[54] PRODUCTION OF CHLORAMPHENICOL, BOTTROMYCIN AND FRADICIN

[72] Inventors: Toju Hata, 94 Nakameguro, 4-chome; Akihiro Matsumae, 10 Isurumaki, 5-chome; Kimihiko Abe, 50 Kameido-machi, 7-chome; Yoshimoto Sano, 18–17 Nishiogi, Kita, all of Tokyo; Mariko Ohtani, 4055 Mutsuura-cho, Yokohama; Satoshi Ohmura, 207 Tamagava, Setamachi, Tokyo, all of Japan

[22] Filed: Aug. 18, 1969

[21] Appl. No.: 851,100

[52] U.S. Cl. .................................................195/80, 195/96
[51] Int. Cl. ..........................................................C12d 9/00
[58] Field of Search ...............................................195/80, 81

[56] References Cited

OTHER PUBLICATIONS

Abe et al., " Studies on Antibiotics" Produced from Kitasatoa Kauaiensis Sp. Nov., J. Antibiotics, 21(a), 1968, pp. 545– 550

Primary Examiner—Joseph M. Golian
Attorney—Howard E. Post and Robert H. Dewey

[57] ABSTRACT

The production of chloramphenicol, bottromycin and fradicin by fermentation utilizing a chloramphenicol-producing microorganism belonging to a new *Kitasatoa* group of the new species of the *Actinoplanaceae*. A live culture of the organism is on deposit with the American Type Culture Collection under the number ATCC 21405.

1 Claims, No Drawings

PRODUCTION OF CHLORAMPHENICOL, BOTTROMYCIN AND FRADICIN

This invention is generally related to a new method of preparing chloramphenicol, bottromycin and fradicin. In this method, the actinomycetes, *Kitasatoa gen. Nov.* belonging to a new genus in the family *Actinoplanaceae* is utilized. That is to say, the characteristic of this invention is the preparation of chloramphenicol, bottromycin and fradicin by fermentation with a new organism of the new genus *Kitasatoa*.

Usually, for the fermentation of the antibiotics chloramphenicol, bottromycin and fradicin, the actinomycetes belonging to a genus *Streptomyces* in the family *Strepto mycetaceae* are utilized. The present inventors have now isolated a new strain of soil organism, given the laboratory designation KA-281, and found that this organism belonged to the family *Actinoplanaceae* but not the *Streptomycetaceae*, and this organism produced chloramphenicol, bottromycin and fradicin. This invention is based on this discovery. A culture of the strain KA-281 has been deposited with the Japanese Type Culture Collection Fermentation of Research Institute, Agency of Industrial Science as FERM No. 177 on June 4, 1968. the address of this institute is:

4-5-Irage-Higashi, Chiba, Chiba-ken, Japan. A live culture of the organism is also on deposit with the American Type Culture Collection under the number ATCC 21405.

Morphological and biological studies of this new strain, KA-281, are as follows:

1. The vegetative mycelium

The vegetative mycelium was 0.5–1.2 $\mu$ in width and well diverged. The septum of the mycelium was usually not recognized, even in the older culture too.

2. The aerial mycelium

The aerial mycelium was 0.5–1.2 $\mu$ in width and grew lineally from the vegetative mycelium. It diverged in all directions, and the common spirals or whorls were not recognized.

3. Conidiospore

The conidiospore developed on the aerial mycelium was cylindrical or ellipsoidal form. The surface of the conidiospore was smooth or rough.

4. Sporangiospore

Sporangiospore formed in a single zoospore or in pairs on the aerial or the vegetative mycelium. This zoospore swam rapidly in the water. On the electron-microscopic observation, the zoospore had a single or double flagella (longer than 100 $\mu$).

5. Other of the organisms indicated various morphological states and were as follows:
   1. The vesicular body (30–50 $\mu$) was formed by gathering mycelium. This vesicular body contained a moist substance, and was covered with a thin membrane. Later, the mycelium netlike body or sclerotic granule, which was covered with sclerotic vessel, was formed from this vesicular body.
   2. On the top of the conidiosphore, sporangium-like organs which produced 5–10 spores were recognized.
   3. Crystalline bodies were recognized.

Cultural Findings:

The above strain is able to grow at 10°–40° C., and the most suitable growth temperature is 25°–32° C.

A colony of this strain on a synthetic media was moist and grew poorly in the early stage, while in the later stage gradually dried to form powdery aerial mycelium, colored reddish or purplish brown. A colony on a glucose nutrient agar was large and yellowish brown, and it protruded on the center and became wrinkled from its center to circumference. White powdery aerial mycelium was formed on the surface in the early culture, and brownish soluble pigment was produced.

In nutrient broth, a pellet of mycelium was formed on the glass wall and on the bottom of the test tube.

In Table 1, culture characteristics, in Table 2, physiological characteristics, and in Table 3, utilization of carbon sources, are listed.

TABLE 1

| | | KA-281 |
|---|---|---|
| Conidia Zoospore | | ellipsoidal cylindrical single or in pairs 3.0–2.0 × 0.9 $\mu$ |
| | G. | poor, reddish brown |
| Glycerol Czapek's agar | A.M. | white |
| | S.P. | reddish brown |
| | G. | dewdrop-like, grayish red brown |
| Glucose Czapek's agar | A.M. | grayish white |
| | S.P. | reddish brown |
| | G. | large, wet, elevated, pale yellow |
| Glucose asparagine agar | A.M. | brownish gray |
| | S.P. | yellowish brown |
| | G. | brown |
| Ca-Malate agar | A.M. | brownish white |
| | S.P. | light brown |
| | G. | yellow |
| Starch agar | A.M. | light brownish white |
| | S.P. | grayish yellow |
| | G. | pale brown |
| Glucose nutrient agar | A.M. | white |
| | S.P. | brown |
| | G. | light brownish gray |
| Peptone agar | A.M. | brownish white |
| | S.P. | pale brown |
| Bennett's | G. | light brownish gray |
| Bennett's agar | A.M. | brownish white |
| | S.P. | brown |
| | G. | pale olive |
| Oat meal agar | A.M. | white |
| | S.P. | brown |
| | G. | yellowish brown |
| Potato plug | A.M. | white |
| | S.P. | grayish yellow brown |
| | G. | pale brown |
| Carrot plug | A.M. | white |
| | S.P. | none |
| | G. | ring and sedimentation yellowish brown |
| Milk | A.M. | white |
| | S.P. | yellowish brown |

G: Growth, A.M.: Aerial mycelium, S.P.: Soluble pigment.

TABLE 2

| | | KA-281 |
|---|---|---|
| Growth condition | temp. | 10°–37° C. |
| | pH | 5.0–8.5 |
| Nitrate reduction | | + |
| Starch hydrolysis | | + |
| Milk peptonization | | − |
| Milk coagulation | | ± |
| Tyrosinase production | | + |
| Melanine production | | + |
| Gelatin liquefaction | | + |
| Cellulose hydrolysis | | − |
| Haemolysis (add 50% house blood) | | ± |

TABLE 3

| | KA-281 |
|---|---|
| Arabinose | + |
| Xylose | ± |

| | |
|---|---|
| Glucose | + |
| Mannose | ± |
| Fructose | ± |
| Lactose | + |
| Saccharose | ± |
| Inositol | ± |
| Rhamnose | − |
| Salicine | + |
| Mannitol | − |

+ = colony formation, production of aerial mycelium

± = colony formation

− = no growth

The new *Kitasatoa kauaiensis*, KA–281, is recognized as belonging to the family *Actinoplanaceae*, differentiated from the family *Streptomycetaceae*, on account of above mentioned morphological and biological characteristics and especially the nature of producing sporangium. (see Bergey's Manual of Determinative Bacteriology (1957) and Actinomycetes II).

Of the family *Actinoplanaceae* producing sporangium, *Actinoplanes* (J. Elishia Mitchell Sci. Soc., 66, 87 1950), *Amplariella* (J. Elishia Mitchell, Sci. Soc., 79, 53 (1963), *Spirillospora* (J. Elishia Mitchell Sci. Soc., 79, 53 (1963), and *Dactinosporangium* (Archiv. für Mikrobiol. 58, 42 (1967), were reported as having motile zoospores, but the said new strain is different from these genera for the reason of producing sporangium on the vegetative mycelium.

The strains belonging to the genus *planomonospora* listed in the key table (Archiv. für Microbiol. 58, 42 (1967) produce a cylindrical sporangium on the aerial mycelium, and the single cylindrical zoospore is in the sporangium. On the other hand, strain KA–281 is diplococcus-like, and in a sporangium many zoospores are included. Accordingly, this new strain, KA–281, is different from the genus *planomonospora*. The location of the sporangium and the morphological state of this new strain is recognized to be different from that of the known genus belonging to the family *Actinoplanaceae*. Then this new strain is concluded to be a new genus belonging to the family *Actinoplanaceae*. The shape and the size of the zoospores and the surface of the conidium are different. Then *Kitasatoa gen. Nov.* is newly established in the family *Actinoplanaceae*, and *Kitasatoa kauaiensis sp. Nov.* is established, and this new strain belongs to this species. A culture of this strain of the living organism isolated from soil and given the laboratory designation KA–281 has been deposited with the Japanese Type Culture Collection, (Fermentation of Research Institute, Agency of Industrial Science and Technology) and added to its permanent collection of micro-organisms as FERM 177.

KA–281: *Kitasatoa kauaiensis Matsumae et al.*

The strain No. KA–281 is characterized as a source of chloramphenicol, bottromycin and fradicin. The term "*Kitasatoa kauaiensis*" has the meaning: the standard strain No. KA–281 as well as natural and artificial variants thereof which produce chloramphenicol, bottromycin and fradicin.

To produce chloramphenicol, bottromycin and fradicin according to the present invention, *Kitasatoa kauaiensis* is cultured in a suitable aqueous nutrient medium. As convenient media, those well known for cultivation of organisms of *Kitasatoa* in stationary or submerged culture are available for the production of chloramphenicol and bottromycin. The fermentation may be advantageously carried out under aerobic conditions with agitation over a period of 2 to 5 days at temperatures in the range of 25° to 35° C., although the range of 26° to 30° C. is preferable. In the preparation of chloramphenicol and bottromycin any nutrient solution in which a strain belonging to *Kitasatoa kauaiensis* grows may be employed. As carbon sources for the fermentation medium, for example glucose, starch, dextrin, molasses, fructose, sucrose, glycerol, lactose and maltose are preferable and nitrogen sources for example meat extract, peptone, soya bean, yeast, ammonium salt, and nitrate are available. Two or more of these nitrogen sources can be used effectively, as inorganic salt; e.g., potassium salt, sodium salt, calcium salt. Phosphate which dissociates into ions may be mixed into a culture media. Various metal ions, for example, magnesium, zinc, cobalt, iron, may also be added in minute or trace quantity to the culture medium if desired.

For example, aerobic fermentation of *Kitasatoa kauaiensis* may be effected in an aqueous medium containing 2% soya bean meal, 2% starch, 0.3% yeast, 0.3% NaCl 0.3% $CaCO_3$, at 28° C. for 96 hours. Chloramphenicol and bottromycin are produced in the same culture broth. The antibacterial activity of chloramphenicol and bottromycin was estimated by a paper disc plate method using *E. soli* growth or nutrient agar at pH 8.0, respectively.

For the isolation of chloramphenicol from the culture broth conventional isolation and purification methods for antibiotics are used. For example, a culture broth is separated into filtrate and mycelium by centrifugation or filtration. Chloramphenicol can be extracted from the filtrate by the use of a hydrophobic polar solvent such as ethyl acetate, butyl acetate, etc. and dried in vacuo. Various methods, such as repeated recrystallization, silica gel or alumina chromatography have been used to isolate chloramphenicol from the crude powder. For the isolation of bottromycin and fradicin from the culture broth, conventional isolation or purification methods for antibiotics are applied. For example, culture broth is separated into filtrate and mycelium by centrifugation or by filtration. The filtrate is extracted by a hydrophobic solvent such as ethyl acetate, chloroform, ethylene chloride, etc. The mycelium is extracted with acetone or methanol, the solvent concentrated in vacuo, and then extracted with the same solvent as the filtrate. Then the extract is dried in vacuo. Or it an be extracted with acidic water from the solvent extract, and then the aqueous layer neutralized and extracted with a solvent such as ethyl acetate in weak alkali, and dried in vacuo to obtain a brownish crude powder containing bottromycin and fradicin.

For the isolation of bottromycin and fradicin from this crude powder, the following methods can be used in combination; that is alumina, silica gel, gel filtration or partition chromatography, etc.

Crude material is placed on an alumina chromatography column and then developed with chloroform and methanol. From the former solvent was obtained bottromycin and from the latter, fradicin. Both are further purified by Sephadex LH 20 column chromatography using methanol. The bottromycin is obtained as pale yellowish needles and recrystallized from hot ethyl ether-n-hexane, while the fradicin is obtained as yellow needles, and recrystallized from methanol-chloroform.

Chloramphenicol which was obtained by such procedures had the following characterstics:

1. Elemental analysis

Found C, 40.94%  H, 3.67%  N, 8.61%
Calcd C, 40.88  H, 3.74  N, 8.67

2. Molecular weight: 232
3. Melting point: 149° C.
4. Optical rotation: $[\alpha] D^{25} = -25.5°$ (ethyl acetate)
5. Solubility:

Soluble in organic solvents such as methanol, ethanol, acetone; insoluble or slightly soluble in chloroform, benzene, water, petroleum ether.

6. Ultraviolet absorption spectrum in methanol $$\lambda_{max}^{MeOH} \quad 278\ m\mu\ (E_{1\ cm.}^{1\%} = 310)$$

7. Infrared absorption spectrum with potassium bromide:

$$\nu_{max}^{KBr}\ 3200, 1680, 1510, 1340, 1240, 1100, 1060, 845, 815\ cm.^{-1}$$

8. Color reaction
   Ninhydrin, Biuret, Molisch and $FeCl_3$ tests. Negative

9. Nature: Neutral substance.
10. Antimicrobial spectrum:

| Test Organisms | Minimum Concentration For complete Inhibition mcg./ml. |
|---|---|
| Sarcina lutea PCI 1001 | 0.6 |
| Micrococcus flavus | 1.25 |
| Staphylococcus aureus 290p | 1.25 |
| Bacillus subtilis PCI 219 | 1.25 |
| Escherichia coli | 0.3 |
| Shigella flexneri | 0.6 |
| Vibrio comma Inaba | 0.15 |
| Klebsiella pneumoniae | 0.15 |
| Salmonella typhosa | 2.5 |
| Mycobacterium ATCC 607 | 1.25 |

Bottromycin, which was obtained by such procedures had the following characteristics:
1. Formula $C_{39}H_{59}N_3O_7S$
2. Molecular weight 781
3. Elementary analysis:

Found:  C, 60.89   H, 7.53   N, 12.59   S, 4.18
Calcd:  C, 61.31   H, 7.55   N, 12.50   S, 4.10

4. Melting Point: 125°–132° C.
5. Optical rotation: $[\alpha]_D^{25} = -32.1$ (C=2 methanol)
6. Solubility:
Soluble in many organic solvents such as methanol, ethanol, acetone, ethyl acetate, chloroform, insoluble or slightly soluble in petroleum ether, n-thexane and water.
7. Color reaction:
Positive: Nitro prusside, Biuret and Folin tests.
Negative: Ninhydrin test.
8. Ultraviolet absorption spectrum in methanol 235–240 m$\mu$ (shoulder)
9. Infrared absorption spectrum with potassium bromide:

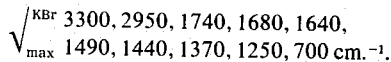
$\nu_{max}^{KBr}$ 3300, 2950, 1740, 1680, 1640, 1490, 1440, 1370, 1250, 700 cm.$^{-1}$.

10. Nature
    Basic substance
11. Antimicrobial spectrum:

| Test Organisms | Minimum Concentration For Complete Inhibition mcg./ml. |
|---|---|
| Sarcina lutea PCI 1001 | 1.25 |
| Micrococcus flavus | 1.25 |
| Staphylococcus aureus 209 P | 0.6 |
| Bacillus subtilis PCI 219 | 0.08 |
| Escherichia coli | 50 |
| Shigella flexneri | >100 |
| Vibrio comma Inaba | 5 |
| Klebsiella pneumoniae | >100 |
| Salmonella typhosa | >100 |
| Mycobacterium ATCC 607 | 50 |

Fradicin which was obtained by such procedures had the following characteristics:
1. Elementary analysis: C. 71.46%, H. 5.59%, N. 11.67%
2. Molecular weight: 500 (Berger method)
3. Melting point: 210° C. (dec)
4. Optical rotation: $[\alpha]_D^{25} = +65°$ C., (C=1 dioxan)
5. Solubility: Easily soluble in water, methanol, ethanol, soluble in chloroform, ethylene chloride.
6. Color reaction: Positive. Zeisel reaction.
7. Nature: Weak basic substance.
8. Ultraviolet absorption spectrum in methanol:

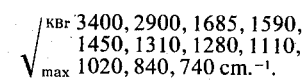
$\lambda_{max}^{MeOH} = 245\ (E_{1\ cm.}^{1\%} = 660)$ 270 (sh), 295 (1720), 325 (sh),
337 (310), 356 (170), 375 (250) m$\mu$.

9. Infrared absorption spectrum with potassium bromide:

$\nu_{max}^{KBr}$ 3400, 2900, 1685, 1590, 1450, 1310, 1280, 1110, 1020, 840, 740 cm.$^{-1}$.

10. Antimicrobial spectrum:

| Test Organisms | Minimum Concentration For Complete Inhibition (mcg./ml.) |
|---|---|
| Aspergillus oryzae | 5 |
| Aspergillus niger | 1.25 |
| Penicillium glaucum | 0.5 |
| Saccharomyces sahe | 10 |
| Willia anomala | 10 |
| Torula rubra | 2.5 |
| Mucor nucedo | 10 |
| Trichophyton interdigitale | 2.5 |
| Staphylococcus aureus | 100 |
| Escherichia coli | 100 |

This substance was identified as fradicin from the properties described above. (Science 113, 261, 1951).

EXAMPLE 1

An aqueous medium containing 2% glucose, 0.5% peptone, 0.5% meat extract, 0.5% NaCl, 0.3% CaCO$_3$ at pH 7.0 is divided into 500 ml. shake flasks in portions of 120 ml. per each, sterilized for 15 min. at 120° C., cooled down to 28° C., inoculated with colonies of Kitasatoa kauaiensis (K—281) (FERM 177) maintained on an agar slant (Krainsky's medium) and shake cultured at 27° C. for 72 hours to obtain a seed culture. Twenty liters of medium with the above-described composition is put in a 30 liter jar fermentor, sterilized at 120° C. for 15 minutes, then cooled to 28° C. and 250 ml. of above-described inoculum is added.

After 48 hour fermentation at 28°–30° C. aerating (20 liter per minute aeration), and agitating 230 r.p.m. to obtain a seed culture, two hundred liters of medium which consists of 2% starch, 2% soybean meal, 0.3% yeast, 0.5% NaCl, 0.3% CaCO$_3$ is put in a 400 liter stainless steel fermentor sterilized at 120° C. for 15 minutes, then cooled to 28° C. and 20 liters of the above seed is inoculated. After 72 hours of fermentation, at 27°–30° C. aerating (200 liters per minute) and agitating 200 r.p.m., mycelium is removed to obtain 360 liters of culture filtrate (bottromycin activity 7.2 mcg./ml.).

The culture filtrate is extracted twice with ethyl acetate at pH 7.2, 80 l. and 40 l. respectively. Ethyl acetate extract is concentrated to 17 liters under vacuum (about 1/5 volume). This solution is then extracted with 0.1 mole acetic acid (1/5 volume) four times.

The acetic acid solution (14.5 liters) is adjusted to pH 7.8 with 3 N × NaOH. The solution is then extracted with ethyl acetate (1/5 volume) three times. Crude brownish bottromycin (5.9 g) is obtained after the solution is concentrated.

The crude bottromycin is dissolved with chloroform and put on alumina column chromatography (alumina 120 g. column 3 × 15 cm.). An active fraction (bottromycin 1.8 g.) is obtained. The above mentioned powder is dissolved with methanol and put on a Sephadex LH 20 column chromatography. Yield 62 percent. Bottromycin (1.5 g.) is obtained as a colorless powder.

EXAMPLE 2

20 L. of aqueous medium containing 2% starch, 2% soya bean, 0.3% yeast, 0.5% NaCl, 0.3% CaCO$_3$, at pH 7.0 in 30 liter jar fermentor was sterilized at 120° C. for 15 minutes.

KA-281 strain was cultured under the same condition as Example 1, and the cultural process was as follows:

| Fermentation Time (Hours) | pH | Starch Remaining (mg./ml.) | Bottromycin (mcg./ml.) |
| --- | --- | --- | --- |
| 0 | 7.3 | 19.0 | — |
| 12 | 7.3 | 12.6 | — |
| 24 | 7.4 | 8.0 | — |
| 36 | 7.0 | 3.8 | 9.5 |
| 48 | 7.2 | 1.3 | 9.0 |
| 60 | 7.2 | 1.3 | 18.6 |
| 72 | 7.3 | — | 18.0 |
| 84 | 7.3 | — | 17.0 |
| 96 | 7.6 | — | 17.0 |
| 108 | 7.7 | — | 18.0 |
| 120 | 7.7 | — | 16.5 |

From this culture filtrate, bottromycin was obtained as in Example 1.

EXAMPLE 3

20 L. of aqueous medium containing 2% starch, 2% corn steep liquor, 0.3% yeast, 0.5% NaCl, and 0.3% $CaCO_3$ at pH 7.0 in a 30 liter jar fermentor was sterilized at 120° C. for 15 minutes.

KA-281 strain was cultured under the same condition as Example 1 and the cultural process was as follows:

| Fermentation Time (hours) | pH | Starch Remaining (mg./ml.) | Bottromycin (mcg./ml.) |
| --- | --- | --- | --- |
| 0 | 7.5 | 17.5 | — |
| 12 | 7.4 | 10.0 | — |
| 24 | 7.6 | 6.8 | — |
| 36 | 8.0 | 2.3 | — |
| 48 | 8.1 | 1.2 | 1.5 |
| 60 | 8.2 | 1.0 | 2.4 |
| 72 | 8.2 | — | 3.0 |
| 84 | 8.4 | — | 3.0 |
| 96 | 8.4 | — | 2.7 |
| 108 | 8.4 | — | 2.0 |
| 120 | 8.4 | — | 1.0 |

From this culture filtrate, bottromycin was obtained as in Example 1.

EXAMPLE 4

1.75 Liters of cultured broth obtained from the same fermentation process as Example 1 was extracted with 6 l. and 4 l. of ethyl acetate at pH 8. Seven liters of the extract was dried in vacuo and 25 g. of crude crystals of chloramphenicol was obtained. These crude crystals were divided into two parts and one was repeatedly recrystallized with an acetone-chloroform system. 370 mg. of colorless needles was obtained. The yield was 24 percent.

The other part was dissolved in a little acetone and put on silica gel chromatography column. The column (2.5 ×20 cm.) was prepared 50 g. of silica gel with benzene. It was developed with acetone; benzene (1:2) and the active fraction was concentrated. After standing with chloroform 950 mg. of brownish needles was obtained and recrystallized with acetone-chloroform and 650 mg. of colorless needles was obtained. Yield was 42 percent.

EXAMPLE 5

Twenty liters of medium prepared with 2% starch, 2% soya bean meal, 0.3% yeast, 0.5% sodium chloride, and 0.3% calcium carbonate was poured into 30 l. jar fermentor, and adjusted to pH 7.0 and sterilized for 15 minutes at 120° C. Then KA-281 strain was cultured as the same condition as Example 4. The result was as follows:

| Fermentation Time, (hours) | | Starch Remaining | Chloramphenicol |
| --- | --- | --- | --- |
| 0 | 7.3 | 19.0 | — |
| 12 | 7.3 | 12.6 | — |
| 24 | 7.4 | 8.0 | — |
| 36 | 7.0 | 3.8 | 1.6 |
| 48 | 7.2 | 1.3 | 2.7 |
| 60 | 7.2 | 1.3 | 4.2 |
| 72 | 7.3 | — | 12.2 |
| 84 | 7.3 | — | 15.2 |
| 96 | 7.6 | — | 15.0 |
| 108 | 7.7 | — | 14.0 |
| 120 | 7.7 | — | 14.3 |

From this fermentation filtrate, chloramphenicol was obtained with the same procedure as Example 4.

EXAMPLE 6

Three hundred and sixty liters of the filtrate obtained from the same fermentation process as Example 1 was extracted with 80 l. and 40 l. portions of ethyl acetate at pH 7.2.

The extract (80 liters) was concentrated to 17 liters and extracted four times with 0.1 M acetic acid solution. The acetic acid phase (14.5 l.) was adjusted to pH 7.8 with 3 N sodium hydroxide and again extracted three times with 1/5 volume of ethyl acetate. The crude powder was dissolved in chloroform and chromatographed on alumina column (alumina 120 g. column 3 × 15 cm.) and developed with methanol. 1.8 G. of fradicin was obtained. Then the powder obtained was dissolved in methanol and chromatographed on Sephadex LH 20 using methanol. 150 mg. of fradicin was obtained as a pale yellow powder. It was dissolved in chloroform and methanol added. 50 mg. of pale yellow needles was obtained. Yield was 9 percent.

What we claim is:

1. The method of manufacturing chloramphenicol, bottromycin and fradicin by fermentation which comprises culturing the micro-organism *Kitasatoa kauaiensis* ATCC 21405 in a fermentation medium.

* * * * *

UNITED STATES PATENT OFFICE
CERTIFICATE OF CORRECTION

Patent No. 3,650,904　　　　　Dated March 21, 1972

Inventor(s) Toju Hata et al

It is certified that error appears in the above-identified patent and that said Letters Patent are hereby corrected as shown below:

Column 4, line 7 - "NaCl" should be --NaCl,--
Column 4, line 12 - "soli" should be --coli--
Column 4, line 31 - "an" should be --can--
Column 4, line 53 - "40.94%" should be --40.95%--
Column 4, line 55 - "232" should be --323--
Column 5, line 9 - "290$_p$" should be --209$_p$--
Column 6, line 38 - "(K-281)" should be --(KA-281)--
Column 7, line 41, last column in the table in Example 3, - "1.0" should be --1.9--
Column 8, line 18 in the table
　　Column 2, the heading has been omitted, should be --pH--;
　　Column 3, the heading should be
　　　　--Starch Remaining
　　　　　(mg/ml)--;
　　Column 4, the heading should be
　　　　--Chloramphenicol
　　　　　(mcg/ml)--.

Signed and sealed this 1st day of August 1972.

(SEAL)
Attest:

EDWARD M. FLETCHER, JR.
Attesting Officer

ROBERT GOTTSCHALK
Commissioner of Patents